310-14 SR SEARCH ROOM
FIP8502 OR 3,449,604

June 10, 1969 H. A. WAGNER 3,449,604

LINEAR LOAD POSITIONER APPARATUS

Filed Jan. 12, 1966

INVENTOR
Howard A. Wagner
BY P. J. Brodahl
ATTORNEY

United States Patent Office 3,449,604

Patented June 10, 1969

3,449,604

LINEAR LOAD POSITIONER APPARATUS

Howard A. Wagner, Pittsburgh, Pa., assignor to Westinghouse Electric Corporation, Pittsburgh, Pa., a corporation of Pennsylvania Filed Jan. 12, 1966, Ser. No. 520,120
Int. Cl. H02k *41/02*
U.S. Cl. 310—14 2 Claims

ABSTRACT OF THE DISCLOSURE

There is disclosed a very accurate load positioner apparatus for effecting a desired mechanical linear movement of a load; a predetermined movement load positioner apparatus including a plurality of movement effecting devices, such as solenoids, each operative for providing a different weighted distance of movement and that requires a minimum stroke movement to position a load to a selected one of a predetermined number of binary weighted load positions.

*Background of the invention*

It has been known in the prior art, for particular magnetic information storage applications, to position mechanically the read-write information storage head operative with a magnetic tape or drum for information storage purposes through operation of a head positioner servo control apparatus, including a closed loop feedback path operative with a signal comparator which receives a desired head position signal that is applied to one input of a comparison circuit to result in movement of the information storage head which in turn causes an actual position feedback signal to be supplied to a second input of the comparison circuit for generating a position error signal to cause the load head to move to the desired position. Additionally, in this prior art load head positioner apparatus, the head is moved from one extreme information storage position to the opposite extreme information storage position within a predetermined movement path corresponding to for example a desired track where the information of the input signal is to be stored or from which previously stored or recorded information is to be withdrawn.

*Summary of the present invention*

It is an object of the present invention to provide an improved linear movement positioning apparatus for a load member, such as for example a signal information head for writing information into a magnetic storage device and for reading out said information, which positioning apparatus is more compact, easier to adjust, less complicated, faster and more accurate in its operation. This more accurate operation allows, for example, interchangeability regarding the resulting storage of information in a particular track of said magnetic storage device in relation to a different positioning apparatus being satisfactory for reading the so stored information from that track and different than the initially employed positioning apparatus used to store the information in that particular track.

The present invention involves a load positioner apparatus for effecting a desired linear movement of an information storage head operative with a magnetic recording medium, which positioner apparatus includes a plurality of movement effecting devices, such as solenoids, each operative for providing a different weighted distance of movement to the information storage head. A first solenoid which has to move the largest mass is operative for the shortest stroke, a second solenoid is operative in conjunction with the first solenoid for moving a lesser mass portion of the load in the same direction for a distance twice the distance of movement of the first solenoid, and a third solenoid is operative to move a still lesser portion of the load head in an opposite direction for a distance four times greater than the movement distance provided by the first solenoid.

Further objects and advantages of the present invention will become apparent from the following detailed description thereof with reference to the drawings, in which:

One objective of the design of the present load positioner apparatus was to move a combination recording, reproducing and erase type of signal information storage head operative with a magnetic tape or magnetic storage drum to discrete positions corresponding to information storage tracks on the tape or drum and to do it very quickly and very precisely. In accordance with the teachings of the prior art, one such head was moved the complete distance across the tape, which could be in the order of several inches or so, through the use of a servo positioning technique that proved expensive and not adequately accurate for the provision of precision placement of the head as required and in addition the movement was rather slow. It should be noted that the prior art load positioner apparatus included a linear resistance member to provide the actual position feedback signal, and this introduced unique irregularities in the feedback signal which prevented the use of one load positioner apparatus with a resultant pre-recorded information storage tape from another load positioner apparatus.

*Description of a preferred embodiment*

Figure 1:
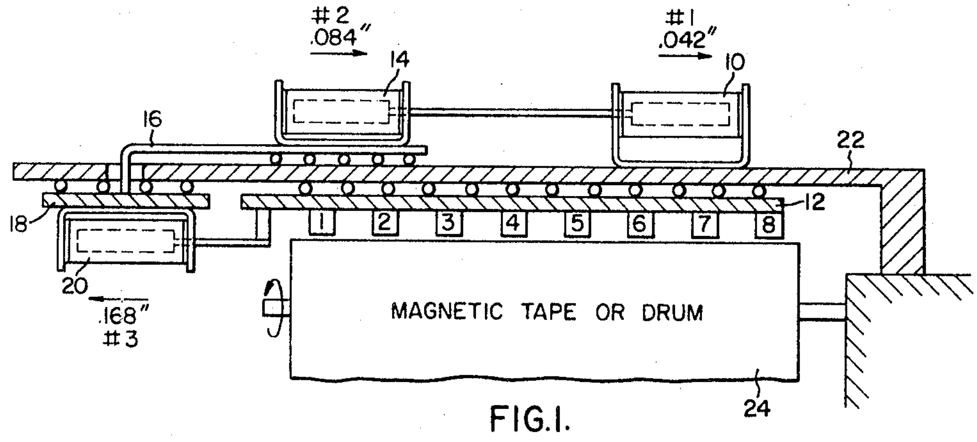
FIG. 1 is a schematic showing of the load positioner apparatus in accordance with the present invention.

The load positioner apparatus in accordance with the present invention as shown in FIG. 1 is a solenoid operated positioner, with the strokes of the separate solenoids being binary weighted and adjusted to move 0.042 inch, 0.084 inch, and 0.168 inch, respectively. These three solenoids were arranged so that their strokes could be added in all possible combinations to give eight distinct and very exact positions, including the starting position when none of the solenoids is energized. For example, by using eight different information storage heads spaced to allow each head to be operative with eight information storage tracks, the strip of heads so provided would cover eight times eight or 64 information storage tracks on a tape as desired. With such an arrangement it was necessary to move the heads only a short distance mechanically and then cooperatively switch them electrically with a suitable switching matrix circuit to select any chosen information storage channel on the tape to provide the desired simplicity, accuracy, high speed and low cost of operation.

In FIG. 1, the first solenoid device 10 is operative to move the head support member 12, for supporting the eight illustrated information storage heads numbered 1 through 8, in a direction to the right 0.042 inch as shown in FIG. 1. The second solenoid device 14 is serially connected in relation to the armature of the first solenoid 10, and is operative to move the head support member 12 0.084 inch to the right as shown in FIG. 1. The first and second solenoid devices 10 and 14 are operatively connected through the shaft member 16 to a support base 18 for the third solenoid device 20. The third solenoid device 20 when energized is operative to move the head support member 12 in a direction to the left as shown in FIG. 1 a distance of 0.168 inch.

Thusly, it will be seen that by selective energizations of one or more combinations of the three solenoid devices as shown in FIG. 1, their respective and resulting movement strokes are effectively added to provide a desired number of positions in a binary weighted arrangement.

However, it is not intended to limit the scope of the present disclosure to the specific magnetic tape information recording application shown in FIG. 1. Also, the in line arrangement could be changed to actuate the support member 12 in some other plane as may be desired.

Each solenoid device has a counteracting mechanical spring opposing its energized movement direction and tending to hold its respective armature in an initial de-energized position relative to its energizing coil, with a stop being provided to determine such initial position. This provides maximum closing force since the armature can bottom in each case even though the strokes are different. The solenoid stops and interconnections are the same generally similar design for all three solenoid devices, so the whole apparatus can be made quite inexpensively with the adjustments for linear travel being made with set screws and locked, and the shape of the interconnecting members being such that they can be easily shaped during assembly so that perfect alignment and freedom of movement is assured. One advantage of the design shown in FIG. 1 is that although the unit has a starting position due to the spring tensions returning each solenoid armature to its initial open position when not energized, the support head 12 can move from any one energized position to any other desired position directly without having to return to a common starting position.

The support member 12 is connected through the illustrated ball bearings or the like to a base member 22 for determining the alignment of the information storage heads 1 through 8 relative to the surface of a magnetic tape or drum member 24.

Figure 2:
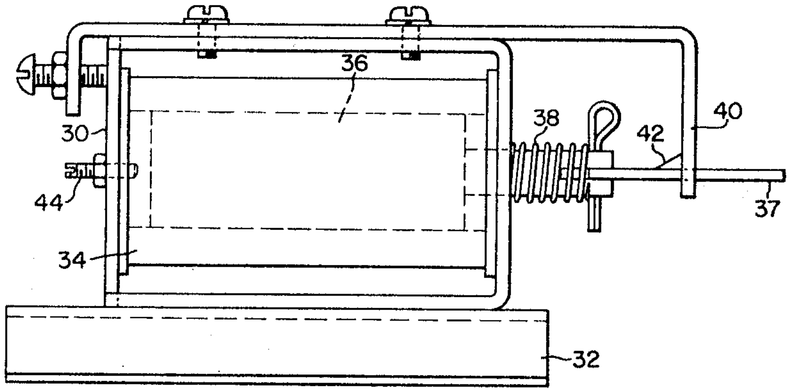
FIG. 2 is a schematic showing of a typical one of the solenoid load positioning members.

In FIG. 2 there is provided a cross sectional showing of a typical one of the solenoid devices including a frame member 30 rigidly fastened to a base member 32 for supporting the solenoid coil 34 for moving the armature 36 against the force of a spring 38 when the coil is energized. A position stop member 40 is operative with a detent 42 on the armature extension 37 connected to the armature 36 for limiting the outward movement of the armature as provided by the force of the spring 38. Thusly when the solenoid coil 34 is not energized, the detent 42 is positioned against the stop member 40 as shown in FIG. 2 by the force of the spring 38. However, when the armature 36 is moved to the left by suitable energization of the solenoid coil 34, the detent 42 moves away from the stop member 40 until the rearward end of the armature 36 bumps against a position limit screw 44.

Figure 3:
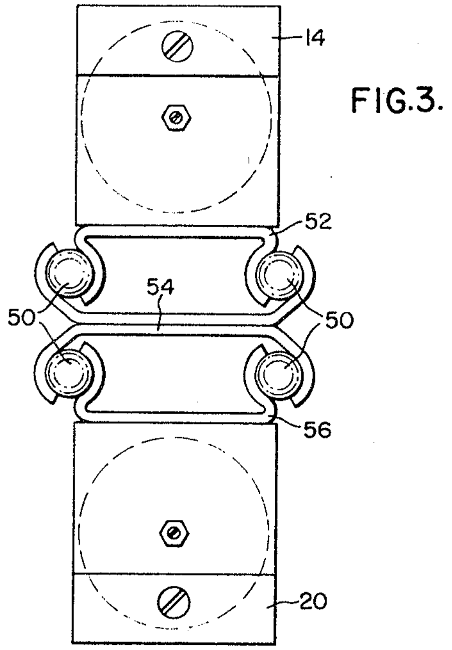
FIG. 3 is an illustrative showing of the provided support connection between the second and third solenoid members.

In FIG. 3 there is shown one suitable arrangement for effecting the desired relative movement of the several members shown in FIG. 1. Ball bearings 50 can be provided between a first member 52 upon which the solenoid device 14 is movably supported relative to a common support member 54. A second movable member 56 is similarly provided to support the cooperating solenoid device 20 such that movement of the solenoid device 20 and the solenoid device 14 relative to the base member 54 is thereby permitted in a restrained manner.

| Position | Movement | Energized solenoid devices | | |
|---|---|---|---|---|
| | | 20 | 14 | 10 |
| 1 | ←0.168 | √ | | |
| 2 | (0.168-0.042) ←0.126 | √ | | √ |
| 3 | (0.168-0.084) ←0.084 | √ | √ | |
| 4 | (0.168-0.084-0.042) ←0.042 | √ | √ | √ |
| 5 | | | | |
| 6 | 0.042→ | | | √ |
| 7 | 0.084→ | | √ | |
| 8 | (0.084+0.042) 0.126→ | | √ | √ |

The above chart illustrates the operation of the three solenoids shown in FIG. 1 to provide eight resulting movement positions corresponding to eight provided information storage tracks within the total movement distance of a given information storage head, such as any one of the storage heads 1 through 8 shown in FIG. 1. The first position listed in the chart corresponds to the energization of the solenoid device 20 alone to result in a movement of the support member 12 to the left for a distance of 0.168 inch such that any one of the eight information storage heads can now be selectively energized through a suitable circuit matrix or the like to provide communication with a particular one of the 64 information storage tracks totally contained on the surface of the magnetic tape or drum 24. The second and adjacent positional movement of the support member 12 is provided by concurrently energizing the third solenoid device 20 and the first solenoid device 10 to result in the eight information storage heads now moving to the right from the first such position a distance of 0.042 inch such that a desired one of the heads can now be selectively employed to communicate with a particular information storage track on the surface of the magnetic taper drum 24. The third operative position is reached by concurrent energization of the third solenoid device 20 and the second solenoid device 14 to now move the support member 12 to a third position 0.084 inch to the right of the first specified position. The fourth operating position is reached by concurrent energization of all three solenoid devices 20, 14 and 10 to move the support member to a position 0.126 inch to the right of the first specified position. A fifth operative position is reached when all three solenoid devices are not energized. The sixth operating position is reached by energizing only the first solenoid device 10 to move the support member 12 to the right 0.042 inch from the fifth position. The seventh position is reached by energizing only the solenoid device 14 to move the support member 12 to the right of the fifth position a distance of 0.084 inch. The eighth and last position is reached by energizing both the first solenoid device 10 and the second solenoid device 14 to move the support member 12 to the right of the fifth position a distance of 0.126 inch.

Thus it can be seen that a load positioner apparatus has been provided suitable for operation in a selected left or right direction from an at rest or not energized position to increase the effective speed of positioning since the average stroke then becomes less than when it was previously required when the rest position was at one of the end extremities of the total stroke movement. The solenoid device 10 which has to move the largest mass is assigned the shortest stroke and is fastened rigidly to the base member 22 so that its location is fixed relative to all the moving parts. The armature of the first solenoid device 10 is connected to the armature of the second solenoid device 14 by direct linkage and its base is then connected to the base 18 of the third solenoid device 20 by arm 16, with the armature of the third solenoid device 20 being in turn connected to the support member 12 which carries the plurality of information storage heads. The illustrated connections greatly improve the resolution or repeatability of the resultant positioning relative to the surface of the magnetic tape or drum 24.

Thusly it has been described that when combinations of the first solenoid device 10 and the second solenoid device 14 are energized, the heads 1 through 8 will move to the right. When the third solenoid device 20 is energized the heads 1 through 8 will move to the far left position. Then with various combinations of the solenoid devices 10, 14 and 20, the heads 1 through 8 will move to a resulting and combined position to yield a total of eight distinct positions including the unenergized position number 5 as illustrated by the chart. It is believed to be well within the skill of this particular art to provide the electrical energy switching circuit arrangements required to energize the solenoid devices as desired to effect the several movement positions illustrated in the chart.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. A linear positioning device comprising:

first, second and third solenoids, each having a coil support and a movable armature, means connecting the coil support of said first solenoid to a fixed point of reference, means connecting the armature of said first solenoid to the armature of said second solenoid, means connecting the coil support of said second solenoid to the coil support of said third solenoid, and means connecting the armature of said third solenoid to a device to be linearly positioned whereby the different respective energizations of any or all of the solenoids are effective to linearly move the device to predetermined different positions.

2. The invention of claim 1 in which the plane of movement for at least one of the solenoids is superposed to the plane of movement of another of said solenoids.

References Cited

UNITED STATES PATENTS

| | | | |
|---|---|---|---|
| 3,306,539 | 2/1967 | Grimland | 235—201 |
| 3,219,854 | 11/1965 | McLaughlin | 310—14 |
| 3,268,747 | 8/1966 | Snowdon | 310—13 |

MILTON O. HIRSHFIELD, *Primary Examiner.*

D. F. DUGGAN, *Assistant Examiner.*

U.S. Cl. X.R.

340—347